United States Patent Office 3,799,963
Patented Mar. 26, 1974

3,799,963
PURIFICATION OF ISOCYANATES BY REDUCING THE HYDROLYZABLE CHLORINE AND ACID CONTENT
Pierrepont Adams, Darien, Conn., assignor to Olin Corporation
No Drawing. Filed May 12, 1972, Ser. No. 252,613
Int. Cl. C07c 119/04
U.S. Cl. 260—453 SP                10 Claims

ABSTRACT OF THE DISCLOSURE

The use of formic acid or derivatives thereof in reducing the hydrolyzable chlorine and acid content of organic isocyanates.

---

This invention relates to a process for reducing the hydrolyzable chlorine and acid content of organic isocyanates, which isocyanates can then be used to advantage in the preparation of polyurethane foam.

The organic isocyanates are valuable chemical intermediates. They have been used extensively in the production of polyurethane elastomers and foams. A commonly used process for the commercial preparation of these organic isocyanates involves reacting phosgene with a primary amine or polyamine. For example toluene diisocyanate is commercially prepared by the phosgenation of toluene diamine to the carbamoyl chloride derivative which, on further heating in the presence of excess phosgene, yields toluene diisocyanate and hydrogen chloride. Quite often, the crude isocyanate product of this phosgenation process, even after being subjected to proper separation and purification techniques, contains small proportions of acidic materials and hydrolyzable chlorine by-products. The presence of these materials, even as relatively small impurities, in organic isocyanates is highly undesirable inasmuch as these materials have a detrimental effect on the utility of organic isocyanates in making polyurethane foam. For example they interfere with the foaming reaction and often have an adverse effect on the properties of the resulting foam.

Accordingly several methods have been suggested in the art for removing or reducing the acidity and hydrolyzable chlorine in organic isocyanates. Thus U.S. Pat. 3,264,336 teaches adding to an organic isocyanate a metal compound, such as cadmium laurate and therafter distilling the mixture to recover the isocyanate with a reduced acidity and hydrolyzable chlorine content.

U.S. Pat. 3,155,699 discloses the use of ferric chloride and other metallic compounds to reduce the hydrolyzable chlorine and acidic constituents of organic isocyanates; and in U.S. Pat. 3,458,558 certain metals, such as copper, are used to achieve the same object.

It has also been taught in the art to prepare biuret polyisocyanates by reacting organic polyisocyanates with anhydrous formic acid. See U.S. Pat. 3,350,438. And Canadian Pat. 751,927 discloses the use of a carboxylic acid having at least two carbon atoms in removing metallic or basic impurities from organic diisocyanates.

Now it has been found, according to the method of the invention, that the acidity and hydrolyzable chlorine content of organic isocyanates can be reduced or eliminated by heating the organic isocyanates in the presence of formic acid or certain derivatives thereof. The isocyanate, having been subjected to this simple and relatively fast treatment, will have a substantially reduced content of acidic and hydrolyzable chlorine impurities. It can then be successfully used, according to the invention, in the preparation of polyurethane foam having improved properties.

It is to be understood that the method of this invention is not limited to any particular group of organic isocyanates although the aromatic polyisocyanates, particularly toluene diisocyanate, are preferred; nor is it limited to those isocyanates which are prepared by any particular method, although the phosgenation reaction referred to above is generally the preferred method of synthesizing organic isocyanates. Rather, any organic isocyanate which is prepared by any method of synthesis and which contains acidic and hydrolyzable chlorine impurities may be treated or purified according to the process of the invention. Thus the process of the invention is applicable to aliphatic, cycloaliphatic, heterocyclic, aryl, and alkaryl mono-, di-, and polyisocyanates. Illustrative of these are octyl isocyanate, hexyl isocyanate, tetramethylene diisocyanate, propylene diisocyanate, cyclohexyl isocyanate, cyclohexylene diisocyanate, toluene diisocyanate, xylylene diisocyanate, diphenylmethane diisocyanate, benzyl isocyanate, phenyl isocyanate, chlorophenyl isocyanate, naphthalene diisocyanate, benzene triisocyanate, and the like.

The term "hydrolyzable chlorine" as used in the specification and claims herein refers to labile chlorine atoms which are loosely, rather than tightly, bound in a compound. The content of hydrolyzable chlorine can generally be determined by reacting the labile chlorine in the isocyanate with a hot water-alcohol solution. The content of chlorine in the product can then be determined by conventional methods such as by titration with a standard silver nitrate solution.

The terms "acidity" and "acidic content" as used in the specification and claims herein refer to any acidic constituent contained in the organic isocyanate. The acidity content of the isocyanate can generally be determined by conventional techniques such as by titration with a base such as a sodium or potassium hydroxide solution.

In practicing the method of the invention, formic acid, certain of its derivatives, or mixtures thereof may be employed. Illustrative of the formic acid derivatives are formic acid salts, the amide and anilide derivatives of formic acid, which derivatives may be substituted or unsubstituted, and isocyanate-formic acid adducts. It is also contemplated that compounds similar to these may be employed according to the invention such as oxalic acid, oxanilide and N,N'-diphenyl urea.

However, according to the preferred embodiments of the invention, one of the following compounds or mixtures thereof are employed:

(a) formic acid,
(b) formamide,
(c) N-alkyl formamide, the alkyl group having 1–8 carbon atoms, such as N-methyl formamide, N,N-dimethyl formamide, N-propyl formamide, N,N-dipropyl formamide, N-hexyl formamide, and the like,
(d) unsubstituted anilide derivatives of formic acid such as formanilide and 1,3-diformyl benzene diamine,
(e) alkyl-substituted anilide derivatives of formic acid, the alkyl substituent having 1–8 carbon atoms and being on the nitrogen and/or on the aromatic ring, such as the N,N'-diformyl-toluene diamines (e.g., N,N'-diformyl-2,4-toluene diamine and 2 - N - methyl-N,N'-diformyl-2,4-toluene diamine), 2,6-diformyl ethyl benzene diamine, N-methylformanilide, and the like, and
(f) adducts of organic isocyanates and formic acid such as the adduct of one mole of toluene diisocyanate with one mole of formic acid.

Due to their particularly efficaceous activity in reducing the acidity and hydrolyzable chlorine of organic isocyanates, the following compounds are particularly preferred for use according to the invention: formic acid, formanilide, the N,N'-diformyl-toluene diamine, N-methylformanilide, adducts of toluene diisocyanate and formic acid, or a mixture thereof; and of these, the most preferred are formic acid, the N,N'-diformyl-toluene diamines such as N,N'-diformyl-2,4-toluene diamine, adducts of toluene diisocyanate and formic acid, or a mixture thereof.

The proportion of formic acid or its derivative which is employed according to the invention depends on the acidity and hydrolyzable chlorine content in the organic isocyanate. Thus any proportion may be employed which is effective in reducing the acidity and hydrolyzable chlorine content of organic isocyanates. Generally, however, the use of great excesses of formic acid or its derivatives should preferably be avoided, as such excesses might increase the viscosity of the organic isocyanate to an undesirable level. From a practical standpoint, a proportion of formic acid or its derivative ranging from about 0.05 to about 5%, and preferably from about 0.1 to about 3%, based on the weight of the isocyanate, may be employed. But the use of lower as well as higher proportions is contemplated depending on the level of acidic and hydrolyzable chlorine impurity which is present.

In accordance with the process of the invention, the formic acid or a derivative thereof is mixed with the organic isocyanate and the mixture is heated to a temperature above about 100° C. but below that at which the organic isocyanate decomposes. Preferably this temperature ranges from about 120° to about 250° C. and more preferably from about 150° to about 200° C.

It is preferred to carry out the heating step under moderate reflux conditions. This may be achieved using reduced pressures. For example at a temperature of about 170° C., satisfactory reflux conditions usually obtain in the case of toluene diisocyanate by using a reduced pressure of about 60–70 mm. of mercury.

It is also preferred to maintain the mixture in continuous agitation while it is being heated. Any suitable means of agitation may be used for this purpose.

The time required to achieve the desired reduction of acidity and hydrolyzable chlorine in the organic isocyanate depends on the temperature used, on the proportion and activity of the particular agent used, be that formic acid, any of its derivatives or a mixture thereof, and on the level of acidity and hydrolyzable chlorine which is desired. For successful use in making polyurethane foam having desirable properties, the organic isocyanate is treated according to the method of the invention until each of the acidity level and the hydrolyzable chlorine level is reduced to about 0.1% or less. Such a result can usually be achieved, by practicing the process of the invention, within about 1–4 hours and quite often within only one hour or even less. This is a particularly desirable and surprising aspect of the process of the invention when compared with prior art methods of achieving the same objective.

After being heated for the desired length of time in the presence of formic acid or a derivative thereof, the organic isocyanate will be ready for immediate use in such applications as the production of urethanes. Treated according to the method of the invention, these organic isocyanates are particularly useful in the preparation of cellular polyurethanes. Thus according to the invention they can be reacted with a polyol, in the presence of a catalyst and a foaming agent, to produce polyurethane foams having improved properties.

The following examples are provided to illustrate the invention. In these examples, all parts and percentages are by weight unless otherwise specified.

EXAMPLE 1

To a 600 gram sample of a crude toluene diisocyanate (80% by weight of the 2,4-isomer and 20% of the 2,6-isomer), which had been prepared by the phosgenation of commercial-grade toluene diamine, there were added 6 grams of anyhydrous formic acid. The mixture was placed in an open vessel equipped with a thermometer and an agitator. Heat was applied to the agitated mixture until a temperature of about 170° was reached. The mixture was maintained at this temperature and at substantially atmospheric pressure for 2 hours during which time the vessel was continuously purged with $CO_2$ gas. Thereafter, the agitation was discontinued and the mixture cooled to room temperature. A measured portion of the mixture was neutralized with 0.01 normal, alcoholic solution of KOH, and based on the amount of KOH used, the acidic content of the mixture was calculated. A second titration with an $AgNO_3$ solution was used with another measured portion of the mixture which was preparatorily hydrolyzed to convert the hydrolyzable chlorine to HCl. Again based on the amount of $AgNO_3$ required, the hydrolyzable chlorine content of the mixture was calculated. The results are provided in Table 1 below.

Another sample, marked "Control," of the crude toluene diisocyanate, which sample was not treated with formic acid, was tested in the same manner described above for its acidic and hydrolyzable chlorine content. The results are provided in Table 1 below.

TABLE 1

| | | Percent | |
| --- | --- | --- | --- |
| Sample | Formic acid used | Acidic content | H.C. content |
| Example 1 | 6 grams | 0.09 | 0.03 |
| Control | None | 1.39 | 1.13 |

EXAMPLE 2

The procedure of Example 1 was followed except that the heating step was performed under reduced pressure conditions, i.e., about 60 mm. of mercury. The acidic content of the treated mixture was calculated at 0.06%.

EXAMPLE 3

The procedure of Example 1 was followed except that the heating step in the presence of formic acid was reduced in time to one hour. The acidity and hydrolyzable chlorine content of the treated product is provided in Table 2 below.

COMPARATIVE TEST I

The identical procedure of Example 3 was followed except that acetic acid was used in place of formic acid. The acidity and hydrolyzable chlorine content of the treated product is provided in Table 2 below.

TABLE 2

| | | Percent | |
| --- | --- | --- | --- |
| | Reagent used | Acidic content | H.C. content |
| Example 3 | Formic acid | 0.10 | 0.04 |
| Comparative Test I | Acetic acid | 0.08 | 0.14 |

EXAMPLE 4

The procedure of Example 1 was followed except that the heating step in the presence of formic acid was cut down to only 15 minutes. The acidity and hydrolyzable chlorine content of the treated product are provided in Table 3 below.

COMPARATIVE TEST II

The identical procedure of Example 4 was followed except that acetic acid was used instead of formic acid. The acidity and hydrolyzable chlorine content of the treated product are provided in Table 3 below.

TABLE 3

| | | Percent | |
| --- | --- | --- | --- |
| | Reagent used | Acidic content | H.C. content |
| Example 5 | Formic acid | 0.12 | 0.17 |
| Comparative Test II | Acetic acid | 0.21 | 0.23 |

The data in Table 3 demonstrates the improved result (i.e. faster action) which obtains from using formic acid, as compared with acetic acid, to reduce the acidity and hydrolyzable chlorine in toluene diisocyanate.

EXAMPLE 5

The procedure of Example 3 was followed except that instead of 6 grams of formic acid, 12 grams of N,N'-diformyl-2,4-toluene diamine were used. The acidity and hydrolyzable chlorine content of the treated product were determined to be 0.08% and 0.10%, respectively.

EXAMPLE 6

A toluene-diisocyanate-formic acid adduct was prepared in the following manner. To 100 mls. of anhydrous ether there were added 87 grams of toluene diisocyanate (80%/20% mixture of 2,4/2,6 isomers), followed by the addition of 23 grams of anhydrous formic acid. As the mixture was stirred, a solid precipitate formed and the temperature of the mixture slowly rose to 32° C. After standing overnight at room temperature, the solid was filtered, washed with ether and air-dried. It weighed 66 grams, and melted at 95–97° C. with softening observed at 80–85° C. A sample of the solid was dissolved in acetone, filtered and recrystallized. After being dried in a desiccator under vacuum, it had a melting point of 96–97° C. and an analysis for carbon, hydrogen and nitrogen indicated the molecular structure $C_{10}H_8N_2O_4$ based on the following:

|  | Percent | |
| --- | --- | --- |
|  | Theory | Found |
| Carbon | 54.55 | 54.45 |
| Hydrogen | 3.64 | 3.56 |
| Nitrogen | 12.73 | 12.89 |

The procedure of Example 3 was followed except that instead of 6 grams of formic acid, 14.35 grams of this toluene-diisocyanate-formic acid adduct, were used and the heating step was performed under reduced pressure conditions, i.e., 60–70 mm. of mercury. Thus treated, toluene diisocyanate was found to contain an average of 0.075% of hydrolyzable chlorine and an average of 0.105% acidity.

What is claimed is:

1. A process for reducing the hydrolyzable chlorine and acidic content of an organic isocyanate containing hydrolyzable chlorine and acidic constituents, which process comprises heating said organic iscoyanate to a temperature above about 100° C. but below the decomposition temperature of said organic isocyanate, in the presence of formic acid or a formic acid derivative selected from the group consisting of N,N'-diformyl-toluene diamine, an adduct of toluene diisocyanate and formic acid, and mixtures thereof, said formic acid or derivatives thereof being employed in a proportion which is effective in reducing the acidity and hydrolyzable chlorine content of said organic isocyanate.

2. The process of claim 1 wherein formic acid is employed.

3. The process of claim 1 wherein said organic isocyanate is toluene diisocyanate.

4. The process of claim 3 wherein said temperature ranges from about 120° C. to about 250° C.

5. The process of claim 4 wherein said heating is effected with continuous agitation.

6. The process of claim 5 wherein said formic acid, N,N'-diformyl-2,4-toluene diamine, or an adduct of toluene diisocyanate and formic acid is employed in a proportion ranging from about 0.05 to about 5% by weight based on the weight of said toluene diisocyanate containing hydrolyzable chlorine and acidic constituents.

7. The process of claim 6 wherein said heating is carried out under mild reflux conditions.

8. The process of claim 7 wherein said temperature ranges from about 140° C. to about 200° C.

9. The process of claim 8 wherein formic acid is employed.

10. The process of claim 9 wherein said toluene diisocyanate is comprised of the crude product of reacting toluene diamine with phosgene.

References Cited
UNITED STATES PATENTS 3,350,438   10/1967   Hennia _____ 260—453
3,660,456   5/1972    Naito et al. _____ 260—453

LEWIS GOTTS, Primary Examiner

D. H. TORRENCE, Assistant Examiner